(12) United States Patent
Litman

(10) Patent No.: US 6,254,002 B1
(45) Date of Patent: Jul. 3, 2001

(54) ANTIFORGERY SECURITY SYSTEM

(76) Inventor: Mark A. Litman, 4610 Browndale Ave., Edina, MN (US) 55424-1143

(*) Notice: Subject to any disclaimer, the term of this patent is extended or adjusted under 35 U.S.C. 154(b) by 0 days.

(21) Appl. No.: 09/361,473

(22) Filed: Jul. 27, 1999

Related U.S. Application Data

(63) Continuation-in-part of application No. 08/907,428, filed on Aug. 7, 1997, now Pat. No. 6,053,406, which is a continuation-in-part of application No. 08/692,753, filed on Aug. 6, 1996, now Pat. No. 5,988,500, which is a continuation-in-part of application No. 08/651,157, filed on May 17, 1996, now Pat. No. 5,834,748.

(51) Int. Cl.[7] ........................................ G06K 7/08
(52) U.S. Cl. ........................ 235/450; 235/449; 235/493
(58) Field of Search .................................. 235/450, 449, 235/453, 491, 493

(56) References Cited

U.S. PATENT DOCUMENTS

| | | | | |
|---|---|---|---|---|
| 3,612,834 | * | 10/1971 | Arikawa | 235/450 |
| 5,103,081 | * | 4/1992 | Fisher et al. | 235/375 |
| 5,216,234 | * | 6/1993 | Bell | 235/494 |
| 5,406,264 | * | 4/1995 | Plonsky et al. | 340/572 |
| 6,029,891 | * | 2/2000 | Freeman et al. | 235/380 |
| 6,053,406 | * | 4/2000 | Litman | 235/449 |

* cited by examiner

Primary Examiner—Karl D. Frech
Assistant Examiner—Daniel St. Cyr
(74) Attorney, Agent, or Firm—Mark A. Litman & Associates, P.A.

(57) ABSTRACT

Security can be enhanced for any circular casino chip, betting chip or token by a magnetically readable system that may be applied to circular casino chip, betting chip or token. A circular casino chip, betting chip or token could be constructed and having at least a first, second and third set of magnetic readable information permanently attached to the circular casino chip, betting chip or token to form a source of magnetically readable information. Each set of magnetic information may have magnetic elements comprising a fiber, magnetic material filled binder, filament or strip, said first magnetic element having at least one magnetic property along the length of said fiber, magnetic filled binder, filament or strip, or physical spacing between said first magnetic element and said second magnetic element which can be mechanically read as different from the magnetic property or position of the second magnetic element. The information can be read from the side of the chip, so that stacks of chips may be read.

3 Claims, 5 Drawing Sheets

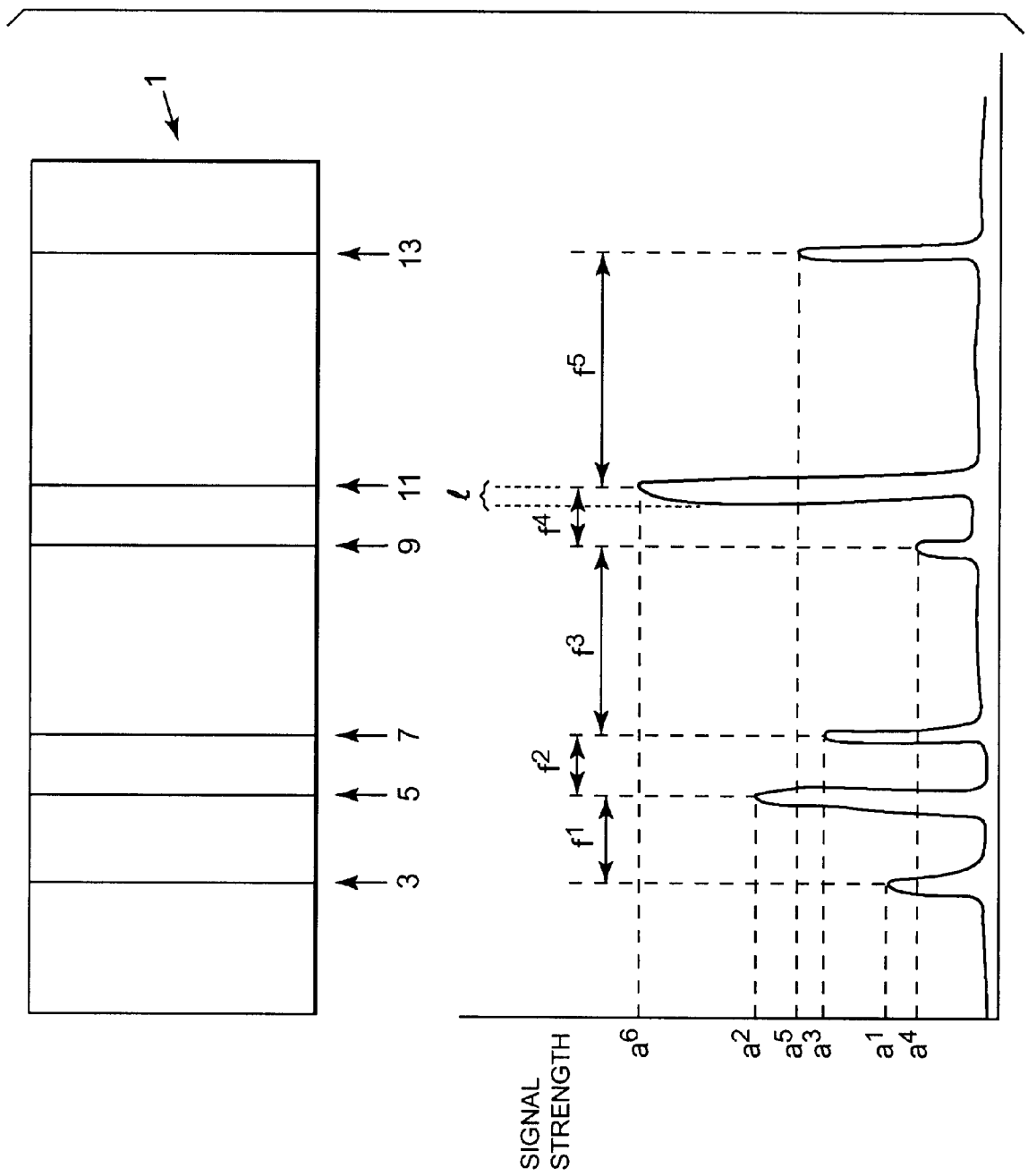

ANTIFORGERY SECURITY SYSTEM

RELATED APPLICATIONS

This Application is a continuation-in-part of U.S. patent application Ser. No. 08/907,428 filed Aug. 7, 1997, now U.S. Pat. No. 6,053,406, which is in turn a continuation-in-part of 08/692,753, filed on Aug. 6, 1996, now U.S. Pat. No. 5,988,500, which is in turn a continuation-in-part of U.S. patent application Ser. No. 08/651,157, filed on May 17, 1996, in the name of Mark A. Litman and each titled Antiforgery Security System, now U.S. Pat. No. 5,834,748.

BACKGROUND OF THE INVENTION

1. Field of the Invention

The present invention relates to 1) apparatus readable (mechanically readable) security means to prevent forgery of circular or oval or otherwise curved appearing transactional items such as coins, casino chips, merchandise and items of commerce, the apparatus which is useful in reading security indicia on such items, and the process of reading or authenticating code implanted in such items. The invention also relates to the presence of a not necessarily security/identification encoding which is contemporaneous read (at approximately the same time) to enable reading of the security coding with high accuracy, even when the relative movement between the security coding and the reading apparatus is not regular (as when the casino chip is moved [e.g., spun] manually or eccentrically along a strip reader). The invention also relates to a method for counting coins, casino chips and the like, while they are in a storage device, such as a rack.

2. Background of the Art

The present invention relates to 1) apparatus readable (mechanically readable) security means to prevent forgery of circular, round, spherical, oval or otherwise curved transactional items, and especially economic transactional items such as coins, casino chips, tokens, CD's, and the like, 2) the apparatus which is useful in reading such transactional items, and 3) the process of reading or authenticating code implanted in transactional items. The invention also relates to a process and secondary device and means for qualifying or approving materials before they will be accepted into a primary device such as a compact disk player, casino chip authenticator, coins operated equipment, token operated equipments, CD-ROM disk driver, floppy, optical or floptical disk drive, and the like.

It is critical to the security of economic systems that the means of implementing economic transactions not be reproducible without providing independent value into that economic system. This is why actions such as forgery, in which false replications are made of economic transactional items such as checks, currency, credit cards and the like, are serious threats to the security interests of people, businesses and nations. There are severe criminal penalties attached to the commission of these crimes of forgery or counterfeiting because of the potential for widespread societal harm from counterfeiting. Unfortunately, technological advances aid the enactment of the crimes of forgery, pirating and duplication as much as it improves the detection of false replications.

The conflict between forgery and detection is hardly new, tracing back further than Greek history, where the proposition of Archimedes' principle was based on an effort to enable detection of forgery. Archimedes was an advisor to the state, which had commissioned the molding of a solid gold crown for a religious ceremony. The authorities wished to assure that the crown was in fact pure gold, but they could not cut into the crown once it had been made as that would have been sacrilegious. While sitting in a bath tub, Archimedes noted the rise and fall of the water level as he lifted various parts of his body in and out of the tub. He predicted that the volume of water displaced was equal to either the volume submerged in the water or the weight of material which floated on the water. The story has it that he ran through the streets yelling "Eureka!" at the discovery, and upon submerging a block of gold equal to the weight of the crown, found that a different volume of water was displaced by the crown than the block of gold. The two items were of different densities and therefore the crown was not pure gold. The forgery was thus detected.

It is equally critical to the security of marketing systems and outlets that the authenticity of goods are assured and that the goods are not be reproducible without value to the originator of the item. This is why actions such as pirating and counterfeiting of mercantile items such as sweaters, shirts, pants, jackets, furniture, compact disks, cassettes and the like, are serious threats to the security interests of businesses. There are severe criminal penalties attached to the commission of crimes of forgery, pirating or counterfeiting, and there are additional costs attached to shoplifting which adversely affects the legitimate dealers, both of which crimes are presently estimated as costing the economies of the world billions of dollars. Unfortunately, it is difficult for store owners or legal authorities to readily identify knock-off or pirated items at the purchase source (wholesale) or sales source (retail).

It is difficult to detect forgeries today, even with the availability of modem technology. This is especially true where such detection has to be performed in the marketplace (in stores, airports, overseas, etc.) and there is no readily available means for accessing proving technology equivalent to the technology clandestinely used to create the forgery. This makes the forgery of market goods and especially apparel and the like relatively easy in today's worldwide economic system. Casino chips and tokens are another item which has to withstand threats to their security. They have a significant cash value (e.g., $100 and $500 chips are common in casinos), they are relatively simple constructions, they have nothing more than printed visible security (e.g., their color and alphanumerics) and modest weight control, and they can be manufactured quite simply with common materials in molds.

Magnetic media have already been used in various forms to attempt to prevent forgery of merchandise and transactional items. Large plastic clips which are adhesively secured or mechanically fastened to boxes or stapled onto fabric goods are commonplace in stores. U.S. Pat. No. 5,434,917 describes a method for encoding individual signals in plastic cards with randomly distributed ferrite particles.

U.S. Pat. No. 5,430,664 describes a method of verifying and counting items such as currency with both magnetic and optical reading of individual pieces of currency. U.S. Pat. No. 5,444,518 adds optical information to recorded images to prevent forgery.

U.S. Pat. No. 5,429,911 describes a method for depositing rows of magnetic materials onto a surface by etching grooves and depositing magnetic materials within the grooves.

U.S. Pat. No. 5,418,855 describes a visual method of testing items (including magnetic strips) by marking the item with inks or dyes that fluoresce when illuminated. Microprocessors analyze and compare signals with standards.

U.S. Pat. No. 5,444,370 describes the use of scanning devices on two ordered target tracks having magnetic sensitivity. Each output track provides different output signals.

U.S. Pat. No. 4,114,032 describes a means for reducing forgery in which materials, including fibers coated with magnetic particles, are embedded in a transactional item such as paper currency or credit cards. The magnetic fibers may be aligned vertically or perpendicularly to the plane of the material within the transactional item, at least when it is manufactured from paper, by having a magnetic field below the paper train. The magnetically filled item is authenticated merely by the presence of magnetic material which will respond to a magnetic plate or the like. A broad range of means for placing magnetic material onto the surface of the fibers is described. The presence of magnetic fibers and magnetic content can be determined by moving the item with respect to scanning means.

U.S. Pat. No. 3,878,367 describes a magnetic security document containing uniformly dispersed magnetic material onto which a magnetic pattern is imposed which can later be identified by scanning means. It is particularly desirable according to the invention to align the magnetizable particles at selected locations during the manufacturing process.

U.S. Pat. No. 3,995,313 describes a data accumulation system which comprises a homogeneous magnetic material which is capable of being magnetized throughout its surface in discrete patterns. The data may be subsequently sensed from recording media.

U.S. Pat. No. 4,183,989 describes a method for authenticating security papers by including both a magnetic signal and a second mechanically or visually readable signal into paper used for security papers such as checks, currency, tickets, credit cards and the like. The machine reading of the two implanted signals helps to authenticate the paper.

It has been proposed in certain literature that magnetic strips can provide both user identification and authentication of the origination of the item (e.g., credit card, etc.). The procedure attempts to have the magnetic reader obtain not only the usual identification information magnetically written onto the magnetic strip, but also reads the random distribution of magnetic particles between the magnetically written information. Because no additional materials, besides the magnetic strip have to be added, the unique random distribution of particles between the magnetically written information are believed to provide a unique fingerprint for each card. Each fingerprint, once read, is stored in a central information bank so that when the card is primarily identified, it is also authenticated by the fingerprint. This system suffers from the drawbacks that the background signal is extremely weak compared to the magnetically written signal, the back ground signal being weak will change easily (even by the influences of being read repeatedly) so that the fingerprint smears and becomes less reliable, and the amount of data produced in reading such a fingerprint is quite large and would take substantial drive space when multiplied by the potential millions of cards read and fingerprinted. This system is described in U.S. Pat. Nos. 5,365,586 and 5,428,683.

U.K. Patent No. 1,127,043 describes security papers having threads, planchettes or fibers with magnetic properties distributed therein which are detectable within the security papers. A magnetic thread may be unwound from a bobbin into a paper making mold or incorporated into a central layer of the paper in the course of manufacture. Alternatively fiber-like pieces may be mixed with the stock suspension so that the magnetic fibers are randomly distributed amongst the normal paper making fibers. The magnetic properties, including the coercivity, retentivity, permeability and hysteresis loss may be measured along with the frequency or directional dependence of the properties.

Substantially all of this work is directed towards the reading of flat, relatively rectangular items, or at least items that are passed only linearly through a reading mechanism, such as a conveyor belt which passes under a broad field reader.

SUMMARY OF THE INVENTION

Items of a curved edge appearance, such as round, spherical, or oval shapes have embedded and/or imprinted mechanically readable random and/or encoded information on them which identifies a class of item or even a class and particular item. The information may be read by a linear reading pass over the item, rotating the item under a reading head, or rolling the item along a path which has a reader positioned to read the data from the item as it passes. The term "circular" or "circular object" as used herein means an object which is approximately circular, as long as that object can roll over a surface. For example, a square would not be able to roll, but a dodecahedron would be able to roll because its flat sides are relatively short compared to the radius of an enclosing circle. Exact mathematic circularity is not required.

The information carried on the item may be provided, for example, by particles and/or elongated magnetic units which are inserted into or onto the elements carried by the item. These elements may be particles (especially particles carried in a binder matrix such as a polymer or composite), and the elongated magnetic elements may be fibers, filaments, long or intertwined fibers or threads, strips, binder mass containing magnetic particles (e.g., a molded linear segment or molded angular segment on an item) or the like. They may even be elongated crystals or elongated particles of magnetic material which are of greater length than the maximum dimensions typically desired in the provision of recordable magnetic particles in printed strips, but this is less preferred. Preferably they are fibers or filaments or strips or molded (magnetic particle-filled) masses. It is not necessary that the magnetic elements are recordable, in the conventional magnetic media sense (as in VHS tape, audio tape, floppy disks, and the like), and in one particular embodiment it may be preferred that the filaments be magnetic without intent or capability of information recordation during operation of the security system.

The security of transactional items can be enhanced by the implementation of a mechanically readable security system which includes at least a mechanically readable magnetic marking embedded in the transactional item. Optical readout of visual signals from the surface of the item may be used in place of or in addition to the magnetic signals, but because these can be more easily duplicated, they are not the most preferred embodiment of the invention. The marking also may be visually notable or readable, but it desired that the item and information be readable by a reading head capable of reading the passage of a magnetic material by the head. The marking is preferably in the form of at least two magnetic areas, such as molded mass, filaments or strips and preferably includes a multiple number of filaments, strips or molded mass of differing coerciveness, magnetic field strength, magnetic field alignment, size, angular percentage of the item and/or spacing so that when the transactional item is passed through the reading device, approval will be given by the apparatus only when the proper signal is provided by the ordered array of appropriate information (e.g., such as that provided by the magnetic elements in the transactional item).

The marking is preferably in the form of at least two magnetic fibers, molded mass, filaments or strips and preferably includes a multiple number of fibers, molded masses, filaments of differing coerciveness, magnetic field strength, magnetic field alignment, size and/or spacing so that when the transactional item is passed at a defined and preferably constant speed through the reading device (which includes a reading device which moves a reading head over a stationary marking), approval will be given by the apparatus only when the proper signal is provided by the ordered array or uniquely distributed array of appropriate magnetic elements in the transactional item.

To avoid the need for increasing the tolerance or expanding the latitude of a signal which is acceptable to a screening of the item because of variations in the relative speed of movement between the item and the magnetic reading equipment, a line of readable material (readable by magnetic, optical, electronic, audio, or other mechanical means) can be read during the movement of the item. By reading the speed (especially the real time speed which can be related to the precise time of reading the magnetic security information) of the movement of the item, the variation in speed from a standard reading speed can be calculated at every moment during the reading of the item, the signals from the magnetic reading of the security coding can be normalized to a standard speed, the signals can be normalized to that standard speed, and a more precise signal can be evaluated for approval. This enhanced system would allow for manual movement of an item through a reading device (as by hand rolling an item or dropping an item down an inclined path), without the need for lowering the tolerances for approval in a security/antiforgery system.

A system is also described for use with casino chips and/or tokens. In this system, a scanning device is provided in a security room and/or at a casino table to generate a signal authenticating the casino chip, particularly when a player brings a chip to the table or removes a chip from a pocket. This system adds additional security to the casino and can reduce fraud, especially where large value chips may even be specifically identified. In this case, even if an electronic signal were duplicated from a previous transmission of a signal and the signal resent through the electronic information carrying system, security can still be provided to the system by comparing previous signals off of the same casino chip to the newest signal. Because of speed variations (which are corrected in the translation of the signal within the most sophisticated system), any recent signals (e.g., the last two, two out of the last three, four or five signals, etc.) which are identical with respect to speed variations along the reading path would be flagged as identical and therefore probably prerecorded rather than newly initiated signals and the transaction refused. Reading devices could be designed with intended speed variations for each different reading of the casino chip information to impose a difference in speed amongst each reading. For example, a chatter, stutter, eccentricity, disuniformity, or random pattern of speed control can be imposed upon the reading equipment (the chip or item moving equipment) to assure that each reading will vary in speed. This would assure that where two signal were in fact identical, there is an extremely high degree of certainty that the signal received was electronically generated from a stored signal and was not presently initiated from a reading of an authentic transactional item.

The markings on the coins or casino chips, as noted herein, extend to the edges of the coin or casino chip. This also allows for the chips to be counted by passing a magnetic reading device parallel to a stack of chips, reading the magnetic elements on the sides of the chip. This can be enhanced by the placing of a magnetic element along the circumference of the chip, with each denomination of chip having a different magnetic signal, that may be a single magnetic response of different intensity for each denomination chip or may be a two to ten unit signal, with or without varying intensity. A greater number of units may be used, but they become superfluous, as the read merely has to differentiate between a limited number of chips (e.g., denominations of 1, 5, 25, 100, 500 and 1,000 dollars are typically used, with $2.50 chips also being common).

BRIEF DESCRIPTION OF THE DRAWINGS

FIG. 5 shows a segment of a transactional item 21 with a magnetically readable strip 65 overlaying a magnetically readable position data line 69 with gradationally spaced magnetic data points 71 along the line 69 and coincident along said line 69 are security distributions of randomly distributed magnetic fibers 67.

DETAILED DESCRIPTION OF THE INVENTION

Figure 1:
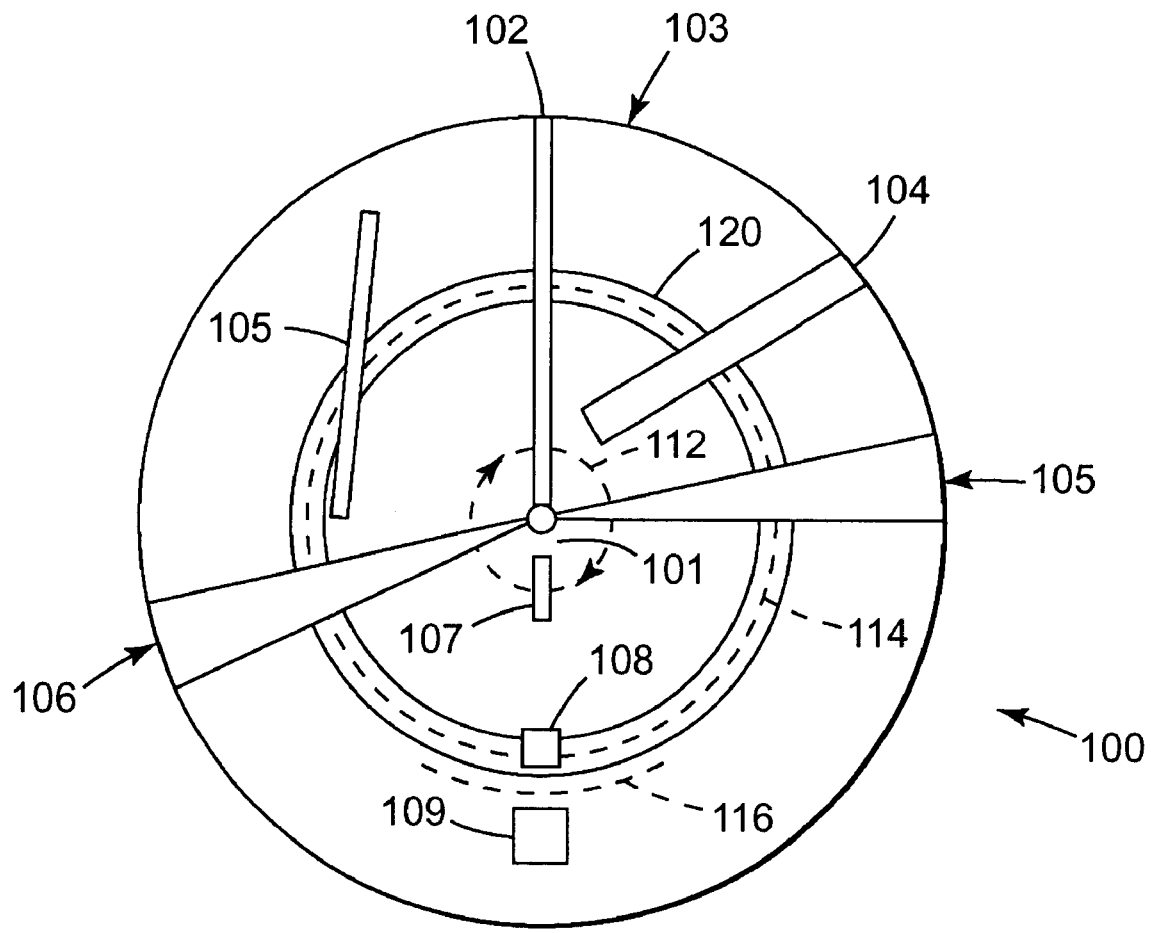
FIG. 1 shows a circular casino chip according to one practice of the present invention.

The most significant means of forgery of an item occurs when an item such as a casino chip or token is fraudulently manufactured. This chip can then be pawned off at the casino in betting transactions at casino locations. Because chips are frequently changed or interchanged, the fraudulent chip can be replaced by the casino with a genuine chip, and the fraudulent chip may circulate through the casino. Even with video security, the original source of a chip (from a particular player) may not be traceable. There is presently little technology which is being used to prevent fraud, except for personal visual casino identification on the chip, such as unique colors, alphanumerics, and the like. Additional security technologies are within the grasp of the manufacturers, but they offer difficulties in manufacture and marketing, especially dramatically increased costs. For example, the cost of adding smart chips (computer readable chips) to a casino chip, could increase the cost of each chip by at least a few dollars, and would require coupling of the chip to an electronic reader, which would require specific pin insertion or other specific electrical interconnection, which would likely be too slow for reading casino chips at a table, where lost time for the table is lost time for the casino.

In addition to a fundamental change in the security encoding envisioned by the practice of the present invention, the latitude and tolerances of the system may be tightened, allowing for enhanced security and greater detail and precision in the information forming the basis of the security encoding, even when the automated or manually driven equipment is imprecisely executed or operating. This will be the first aspect of the present invention described herein.

In any machine read information, where the information is distributed over and area, and usually in a line, some sort of scanning of the area or the line must be performed. This requires that there be some relative movement between the information stored on the item and the reading apparatus (the relative movement may be more virtual, as in the movement of a focal point or reflection if the system is optically read). For example, with a magnetic strip of information on a casino chip or token, the casino chip may be secured in place and a magnetic reading head moved over the surface of the casino chip, or the reading head is stationary and the casino chip is moved relative to the reading head. Because the token is usually round or oval (although other shapes such as squares could be read with circular motion if the casino chip were spun), the casino chip can be rolled along a surface (with the reading heads passing along the sides of the chip) or the chip can be spun under a reading head (with the reading head either not moving or moving relatively radially with respect to the casino chip). By reading the chip in a relatively circular path, a regular liner signal can be read and repeated.

One significant problem in such information reading is the fact that if the encoded information contains any frequency components (e.g., spacing between individual signals), the relative speed of the movement between the reading system and the magnetic information becomes important. If the speed varies, the signal will vary, and if the signal varies significantly, approval of the read information may be denied. To prevent improper denial of security because of machine speed operation variations, the latitude of acceptance and/or the tolerance of the system for variations in speed (and hence signal identity) has had to be increased. This weakens the security effectiveness of the system.

The present invention includes, for example, a circular casino chip, betting chip or token having information thereon which can be mechanically read to identify or authenticate the item, said information comprising encoded information identifying or authenticating said circular casino chip, betting chip or token which can be read at a radial distance from a center of said circular casino chip, betting chip or token by a single pass relative to a mechanical reading element, at least some of said information extending radially relative to a face of said circular casino chip, betting chip or token. The circular casino chip, betting chip or token may have at least some of the information extending radially comprising magnetic information. The circular casino chip, betting chip or token mah have the magnetic information at least in part comprise a mass of binder containing magnetic material which forms a part of said circular casino chip, betting chip or token. The circular casino chip, betting chip or token may have some part of the magnetic information of said circular casino chip, betting chip or token comprise a radial segment (e.g., similar to a pie slice) of said circular casino chip, betting chip or token. The circular casino chip, betting chip or token may have at least one said radial segment also provide information which is readable from an edge of said circular casino chip, betting chip or token. The circular casino chip, betting chip or token may have an edge having information which can be mechanically read to identify or authenticate the circular casino chip, betting chip or token. The circular casino chip, betting chip or token of may or may not have at least one radial segment providing information which is readable from an edge of said circular casino chip, betting chip or token.

A method is also presented for authenticating or identifying these circular casino chips, betting chips or tokens comprising placing said circular casino chip, betting chip or token in position relative to a reading element which can read said information on said circular casino chip, betting chip or token, moving said circular casino chip, betting chip or token relative to said reading element, reading said information from said circular casino chip, betting chip or token, and comparing said information from said reading to second information relating to authenticating or identifying data for circular casino chips, betting chips or tokens and determining if said circular casino chip, betting chip or token is authentic or specifically identified. The method may have the circular casino chip, betting chip or token moved and the reading element not moved. The method may have the circular casino chip, betting chip or token not moved during reading, and reading heads on the reading element are moved relative to the circular casino chip, betting chip or token. Usually the information is read from at least one face of the circular casino chip, betting chip or token.

The method may have the circular casino chip, betting chip or token with at least a first and second magnetic element permanently attached to the item forming a first source of magnetic information, each magnetic element comprising a fiber, filament, magnetically filed mass, or strip, said first magnetic element having at least one magnetic property along the length of the fiber, filament, magnetic mass, or strip or physical spacing from the second magnetic element which can be mechanically read as different from a magnetic property or position of the second magnetic element. The method may have magnetic information along an edge of the circular casino chip, betting chip or token which is read during the same time that magnetic information is read from a face of said circular casino chip, betting chip or token. The method may be performed with the circular casino chip, betting chip or token having two sets of readable information thereon, at least one set of information comprising at least three magnetic elements attached to the circular casino chip, betting chip or token forming a first source of magnetic information, at least one of said at least three magnetic elements having a magnetic strength or pulse length which can be mechanically read as different from the magnetic strength or pulse length of another magnetic element, said magnetic elements having a spacing defining a period when said magnetic elements are mechanically read while said reading element moves relatively in a concentric circle with edges of said circular casino chip, betting chip or token.

The method of authenticating the circular casino chip, betting chip or token may be performed where the circular casino chip, betting chip or token has at least four magnetic elements, each of said three magnetic elements having at least one dimension which is at least three times greater than any other dimension of said magnetic element and which form a first source of magnetically readable information, said method comprising a) magnetically reading said magnetic elements in said circular casino chip, betting chip or token by moving magnetic reading head in a circular path along said circular casino chip, betting chip or token which allows said reading head to pick up signals from said at least three magnetic elements to generate a first signal, b) comparing said first signal to a second signal which has been predetermined to authenticate a specific article or one of a series of circular casino chips, betting chips or tokens, c) determining if a level of correspondence between said first and second signal is sufficient to allow authentication of said circular casino chip, betting chip or token. This method may be practiced where there is a second source of information present on said circular casino chip, betting chip or token, the second source of information being disposed in said circular casino chip, betting chip or token so that when the first set of information in the circular casino chip, betting chip or token is read by relative movement of a first reading device, a reading device which has no relative movement with respect to the first reading device may read the second source of information from the circular casino chip, betting chip or token at a relative speed with respect to the second source of information which is identical to the relative speed between the first set of information and the relative movement of the first reading device, the reading of the second source of information providing data which indicates the speed of the circular casino chip, betting chip or token relative to the reading device which has no relative movement with respect to the first reading device during a time period when the second source of information is being moved relative to a reading device which has no relative movement with respect to the first reading device.

Another process for accurately reading information from a circular casino chip, betting chip or token may be described as having relative movement between a mechanically readable first source of information on the circular casino chip, betting chip or token and a mechanical reading device, said process comprising:

a) causing relative movement between said first source of information and a device which can read said first source of information to create a first data stream, b) reading said first source of information with said device which can read said first source of information to cause a first data stream, c) at the same time that said first source of information is read, reading from said circular casino chip, betting chip or token a second source of information with a reading device which moves relative to a source of said second information on said circular casino chip, betting chip or token to create a second data stream, said second source of information having a known pattern of information, d) determining from said reading of said second source of information the speed of relative movement at each point along a path, which said relative movement is between said second source of information as it moves while it is being read, e) using the speed of relative movement of said at each point along a path to correct variations in said first data stream caused by variations in speed with respect to said relative movement between said first source of information and said first reading device.

The process may be performed where the first source of information and the second source of information are each magnetic information which can be read by:

a) a single reading device which can differentiate the first and second source of information or b) two separate reading devices, one reading device which reads the first source of information and a second reading device which reads the second source of information.

A circular casino chip, betting chip or token having at least a first and second set of magnetic information permanently attached to the circular casino chip, betting chip or token to form a source of magnetically readable information which can be read from said circular casino chip, betting chip or token by relative movement of said circular casino chip, betting chip or token past a magnetic reading device, with said relative movement occurring along a path, said first set of magnetic information having at least one magnetic property a) along the path which intersects a filament, magentic material-impregnated mass, or strip or b) physical spacing among said first and second magnetic set of magnetic magnetic information which can be mechanically read as different from a magnetic property or relative position of the second set of magnetic information, said first set of magnetic information and said second set of magnetic information being having information which can be distinguished from one another, even if read by a single reading device simultaneously, said second set of mechanically readable information being readable during relative movement of said circular casino chip, betting chip or token along said path, said second set of magnetic information having a known pattern of information which can be used to determine the instantaneous speed of relative movement of said circular casino chip, betting chip or token with respect to said reading element at any time during said relative movement of said item.

The method mah have the said reading element simultaneously read a) information from a first set of magnetic information and a second set of magnetic information, and b) both sets of magnetic information are read during a single relative movement of said circular casino chip, betting chip or token relative to said reading element.

One additional aspect of the present invention provides a means for normalizing data read from an information reading device, the normalization being done to remove variations in data which are caused by variations in relative speed between the data source and the reading source. The basic premise of the invention is as follows:

1) a security reading system is provided on a medium or item which is read by relative movement between a reading device and the security information embedded in the item as a first type of information, 2) at least a portion of the information which is read during said relative movement is dependent upon the relative speed of said relative movement, 3) providing a second type of information on said item which is capable of being read at the same time as the first type of information is being read (by the same or different reading mechanism), said second type of information having a known relationship between pieces, segments, bits, or points of information within said second type of information, 4) reading said second type of information at the same time that said first type of information is being read to generate data from said second type of information, 5) comparing the data from said second type of information with the known relationship within said second type of information to provide an indication of the relative speed and/or relative position of the medium or item (and/or portions of the second type of information thereon) at any given time during relative movement of said item, medium, first type of information, and/or second type of information, and 6) using said indication of the relative speed and/or relative position to normalize data taken from relative movement between a reading device and the security information embedded in the item as a first type of information.

The ease and benefits of this system can be readily seen in this description and in the following exemplifications of the practice of the present invention. The simplest configuration of the present invention would be as follows. A first type of information (e.g., magnetic information) comprising the security information is located along a path (linear, circular, sinusoidal, or any other predetermined shape, but preferably a straight-line or circular line reading path) which would be traversed by the relative motion of a reading head. Within this same path would be a second region of information(e.g., magnetic information) which can generate a signal which could be readily differentiated from the security information signal. This ready differentiation could be done by having the security signal limited to intensities below a specific value (e.g., a cut-off value) and the positioning information limited to intensities above that specific value. The reading (e.g., magnetic reading) would therefore produce two readily differentiated signals by reading as one signal all data point below the cut-off value and reading a second signal as all values above the cut-off value. By spacing the positioning information at known intervals (repeating identical intervals is preferred and the simplest, but any pattern, either repeating or nonrepeating, as long as it is clearly identified), the speed of the relative movement between the magnetic reading head and the item can be readily calculated at any position along the path of relative movement. This is readily accomplished because the spacing between the segments, pieces, bits, elements or other aspects of information are a fixed and known quantity or pattern, and the signal read from the second type of information provides data of frequency and time. As the frequency is the time between (individual) signals, and the physical spacing between the individual signals is a known quantity, the time of moving the distance between individual signals (the speed) can be calculated at least between each point of information. Since the actual speed of the relative movement of the item during reading of the second type of information can be directly calculated, the actual speed during reading of the second type of information, which is the actual speed during contemporaneous reading of the first type of information can also be directly calculated. This direct calculation of the speed can be used to point-by-point, or by interpolation, in analog fashion, convert all data relating to the first type of information to a data stream which corrects for variations in relative speed. This correction greatly improves the accuracy of the information and improves the quality of the tolerances allowed in the system for providing tighter, less reproducible codes. The normalized data generated by this correction can then be compared to a normal speed (the speed of relative movement at which a specific signal would be generated by a reading of the first type of information), and the normal data compared to the expected data at the normal speed. In this manner, variations in speed of relative movement can be compensated for within reducing the specificity and detail of the coded data.

The system of the present invention is also described for use with security examinations directly at a casino table or cashier. It is important to be able to confirm the authenticity of a casino chip quickly and at a number of different locations with minimum cost increases in the manufacture of the casino chip and/or the purchase of equipment. In this system of the present invention, a scanning device similar to that used in the other aspects of the present invention for direct consumer interaction is provided at the casino table and/or cashier to generate a signal authenticating the casino chip when a player provides a chip to the house, particularly where the casino chip is brought to the table from somewhere else or the chip is being changed for chips of a different value. This signal can be directly authenticated by a chip in the reader or preferably by transfer of the data into a central computer for authentication. This system adds significant additional security to the antiforgery security of the casino chip beyond the merely visual security presently provided. It is particularly noteworthy that the reading equipment can be simply manufactured with only slight modification from credit card reader printers. In the present invention, for example, the casino chip could be rolled down the slide path, providing a readable signal to the reader. Or an alignment device or implement (e.g., a notch in the chip to align it so that the chip may be slid without rotation down the reading path.

Because of the nature of the data being electronic when it is transferred to the receiving party, it is possible to intercept a signal, record it and use that captured signal in an on-line transmission of the signal (e.g., where casino staff might be involved in the fraud), or the captured signal implanted onto a fraudulently manufactured casino chip. The practice of the present invention with the speed variant correction in the translation/reading of the signal can be used to reduce the likelihood of a captured signal being used successfully, at least reducing the likelihood that it can be used more than once. Even if an electronic signal were captured or duplicated from a card and the signal resent through the electronic information carrying system, security can still be provided to the system by comparing previous signals off of the same value of casino chip to the newest signal. Where the system is used with higher denomination chips (e.g., $500 or $1000), the individual chips may have identification information on them, and the received signals compared to previous receptions from those individual chips. Because of inherent speed variations (which are corrected in the translation of the signal within the system) naturally caused by variations in hand speed, hand angles, machine differences, machine wear, etc., any recent signals (e.g., the last two, two out of the last three, four or five signals, etc.) which are identical with respect to speed variations along the reading path would be flagged as identical and therefore indicate that they were probably prerecorded rather than newly initiated signals and the transaction could be refused. Reading devices could be designed with intended speed variations for each different reading of the casino chip information to impose a difference in speed amongst each reading. For example, a chatter, stutter, eccentricity, disuniformity, or random pattern of speed control can be imposed upon the reading equipment (the casino chip or item moving equipment) to assure that each reading will vary in speed. This would assure that where two signal were in fact identical, there is an extremely high degree of certainty that the signal received was electronically generated from a stored signal and was not presently initiated from a reading of a transactional item.

Variations in the speed of the reading of the casino chip can be imposed on the equipment itself so that natural variations which may be caused by different hand speeds, hand angles, machine differences and machine wear can be enhanced or assured. For example, where the casino chip is rolled on a flat slide surface, bumps can be added to the slide surface to cause irregularities. Where the casino chip is spun for reading, the spinning can be designed to vary its speed of rotation. Even if the irregularities would remain constant, the variations would increase because of the increase in difficulty in moving in the linear path over the variations. Where a series of rollers are used to support the transactional item during its movement (either its movement along an edge or along a major surface, i.e., a surface defined by its length and width and not just its length and thickness or width and thickness as done in an edge reading), the rollers could be made eccentric in their cross-section so that they would not rotate precisely in a circle. Where there are a number of rollers, with a number of them being eccentric in their rotational shape or axle support, a variation in speed, which would not be readily reproducible or repeatable because of the statistical variation in the relative position of the rollers could be provided. These types of systems would be particularly beneficial with hand or manually accessed card reading systems.

The casino chip could also be read by reading information off the edge of the casino chip, whereby the information could be placed only on the outside edge of the chip or on the outside edge in combination with data in other locations on the casino chip.

Mechanical, automated systems of reading have always attempted to achieve uniformity of speed movement through the system. It would be desirable in the practice of the present system, where casino chips are read by insertion into a mechanical automated reading system which fixes the casino chip and moves a reading head or moves the casino chip past a fixed reading head (or moves both the casino chip and the reading head) to impose a variability to the speed of relative movement of the casino chip (transactional item) and the reading head. The signal would be sent to a central bank of information, however, there would be an extra series of steps performed to ensure authenticity. The last signal would be compared to at least one previous signal, e.g., the next-to-last signal with respect to the actual signal read. The signals would be compared, and because of the different speeds which would be expected (or effected by the imposed variants in the equipment), the signal would not be expected to be identical. If the last signal and the signal or signals ([written as signal(s)] to which the last signal is compared are identical, that would be a clear indication of the likelihood if not the absolute fact that the last signal was electronically generated and was a captured signal. Upon a comparison indicating the likelihood of a captured signal being used in the transaction, an alert could be imposed upon the transaction which would cause the transaction to be terminated, additional information to be sent, a repeat of the scanning information to be sent, or some other special response to the indication of the questionable signal.

The process for this enhanced security includes the process for accurately reading information from an item as described above and hereinbelow. The process requires that there is relative movement between a mechanically readable first source of information on said item and a mechanical reading device, the process comprising:

a) causing relative movement between a first source of information and a device which can read said first source of information to create a first data stream, b) reading said first source of information with said device which can read said first source of information to cause a first data stream, c) at the same time that said first source of information is read, reading from said item a second source of information with a reading device which moves relative to said source of said second information on said item to create a second data stream, said second source of information having a known pattern of information, d) determining from said reading of said second source of information the speed of relative movement of said at each point along a path which said relative movement between said second source of information moves while it is being read, e) using the speed of relative movement of said at each point along a path which said relative movement between said second source of information moves while it is being read to correct variations in said first data stream caused by variations in speed with respect to said relative movement between said first source of information and said first reading device. It is specifically contemplated that the relative movement might be rotational, with either one or both of the item (e.g., casino chip or token) and the reading head be circular, spiral (e.g., as an old phonograph record was helical or spiral). A casino chip, for example, may be spun in place under a reading head or rolled by a bank, series or single reading head.

Many variations within this system may also be practiced, as for example, by having two speed measuring strips on opposite sides (opposite edges) of a card or item. The angularity of the magnetic elements may be read in two passes of the card through the reading head. This is done because the card may be read on the opposite edges, the speed corrected, and a precise reading of the same series of magnetic elements at two different locations (e.g., at two radial distances) can be provided. From this data the angularity (or relative non-radial alignment) of the respective strips can be read. The magnetic elements may have zero, one, two or more of the elements parallel, angled or perpendicular to the edges, with any variation from zero to all of the elements perpendicular to the opposed edges or not perpendicular to the edges.

Multiple reading heads may be provided into the system, with one or all of the reading heads operating at the same time or in sequence. For example, there may be multiple reading strips printed onto the casino chip or item, as information or as speed correcting data. The reading heads may operate to read one or more of the strips as the casino chip or item moves through the reading device. The various strips may be read together, one at a time, partially in sequence, or in any other programmed combination which is desired to enhance the security of the system.

A circular (e.g., magnetically) readable item 100 is shown in FIG. 1. This item contains magnetic elements 102, 104, 105, 106, 107, 108, 109. These segments may run from a center 101 to an edge 103, or as with elements 104 and 106, may not intersect the center either actually or virtually (by extension of their line). Each of the elements 102, 104, 105, 106, 107, 108, 109 may contain a readable, e.g., magnetically readable is emphasized (but not necessarily recordable), but optical reading may also be used. Where the item is magnetically readable, a readable magnetic material such as a filament, as a coating on a filament, or as an embedded or otherwise carried material in or on said filament, fiber, strip, or other elongated element (e.g., a molded section of the item with magnetic particles therein). These magnetic elements, in a less preferred embodiment, may be more randomly distributed or embedded in a particular pattern within the item. Certain of the elements (e.g., 105 and 106) are angular segments or slices of the circular readable item, either of the same or different angular size. Other elements (e.g., 102 and 104) may have different widths, as well as different magnetic intensity or coercivity. Others may have discontinuous segments, arranged radially (e.g., 107, 108, and 109) or non radially (not shown, but would look like 107, 108, and 109 not aligned along the same radius.

When the element is magnetically read by a reading head (not shown) which moves in a direction along circular path 112 only those segments which intersect the center 101 are read by the reading head. The same is not true with reading path 114 which intersect elements 104 and 105 which do not intersect (either actually or virtually) the center 101 of the circular item 100. Partial circular path 116 is noteworthy in that it does not intersect the segmented triad of 107, 108, and 109. The various forms of information such as spacing between elements, individual element intensity, persistence (signal width), and (with two readings spaced apart (e.g., as between paths 112 and 114 or with two magnetic reading heads) the angularity of filaments (e.g., as between elements 102 and 104, and the angle of a single segment (e.g., 105) are read. Some of these signals are dependent upon the speed of the relative movement of the reading head as it passes over or between the elements or filaments (persistence, interval [frequency] and angularity). It would therefore be an idealized apparatus which moved at a single, invariant and constant speed relative to the casino chip or item and the magnetic element information therein. Such perfection is not achievable without great economic costs in the construction of the reading equipment, and the need for uniformity in the speed would eliminate the possibility of casino chips being moved by hand or free falling (free rolling) through a reading track or slot as is most commonly done in commercial outlets. Building in a latitude or softness to the precision of the signals to overlook speed variations would reduce the overall security of the system.

One aspect of the present invention relates to a construction and process in the system which allow for speed variations in the relative movement between a magnetic reader and the information on the item which is to be read during the relative movement. This aspect of the present invention is performed by a process whereby, in addition to the direct security information provided by the magnetic elements 102, 104, 105, 106, 107, 108, 109, at least a second source of readable information (mechanically readable as by magnetic readers, bar code scanning, optical reading, interference reading, or any other mechanically readable format), which source of information is capable of providing information of the relative speed between the item and the magnetic reading head. This between the item and the magnetic reading head. This information does not necessarily have to be direct information as to read time speed or speed at various positions along the path of movement 112 or 114. The simplest method of providing and reading this information is to provide a line of information 120 which is read along path 114, with the general alignment of the line of information 120 located in a distribution included within a line inclusive of or identical to the path of relative movement of the magnetic reading read and the magnetic elements with the security information encoded therein. The simplest element for this purpose would be a pattern or element with evenly and uniformly spaced readable signals of identical intensity along a circular line 120. The information, for example, may be in the form of uniform elements or data which lies along the line 120. When the distribution of information, or more importantly, at any position or change in position relative to the magnetic reading element and security information, can readily be determined by calculation, usually by direct conversion software hardware or chip in the system. As the spacing between the information along readable element or line 120 is known and the time between signals (and hence between these position readable elements) is read, the speed (fixed distance/variable time) can be used to calculate the actual speed of the item relative to a fixed or relative portion. With this calculation or determination in hand, the speed of the item of any time or any point when the security information is being read can be determined. The actual signal read on the security elements can then be converted to data consistent with a particular speed at the time of the reading of the information.

An aspect of the present invention relating to the correction of motions defects or inconsistency in the reading of information on an item would comprise an article containing a first readable signal on an item, which signal is read by the relative movement of the item and a mechanical reading instrument (e.g., magnetic, optical, electronic, bar coding, laser responsive, reflective, etc.). At least a second readable signal is implanted in the article which has a predetermined and measurable code or frequency in the second signal. The second signal is located within the item so that the second signal is read at the same time as the first signal is read, with the movement of the item being along a path during reading of the first signal which allows a reading of the second signal so that the relative speed of movement of the item and the second information reading device can be determined in direct correlation to the time at which the first signal is read. The second information base is preferably magnetically read information, but may be based upon the other alternative technologies to provide what is referred to herein as the "positioning" information or the "relative speed" information. The first and second reading device may be the same device, different devices, and different types of devices. For example, with a bar code read device or other visually inspected device, a separate strip of magnetic information could be provided and read as the positioning information by a separate magnetic reader. Two separate areas of magnetic information could be provided on an item, with the information to be read by separate magnetic reading heads. An effective and preferred construction in the practice of the present invention would include an item having at least two overlaid information contents which could be distinguished by a single reading by a single magnetic reading head. For example, underneath a conventional printed strip of ink could be the distribution of random magnetic fibers according to the present invention. The identification information of the item (e.g., a credit card) could also function as the positional information, since all data points in the identification information are known. The two types of information could be distinguishable within the entire content of information being read by the single pass by a magnetic reading head. For example, all of the information from the informational bank of signals could have a coercivity below a fixed value, and all of the security information could have a coercivity above that certain value. Similarly, the two different types of data could be separated by a demarcation between persistence (duration) of signals, and even relative frequencies between signals, and/or combinations of these. The data would be 'filtered' to separate the two data streams, and each filtered flow would be used for its unique purpose. If it were not desired to use the information stream of information as the positioning stream of information, a third type of information which could be filtered into its own unique stream of data could also be provided. The three streams of data could be filtered by gateways or fences in the data stream according to known filtering techniques. The same filtering base (e.g., coercivity) could be used to distinguish the three (or more) streams, or combinations or variations amongst coercivity, duration, amplitude, frequency, and angularity could be used. Two separate reading apparatus operating at the same time would simplify the ability to separate the data without compromising the quality of the performance of the system. a particular narrow aspect of the present invention includes the use of this system on a circular item with circular reading paths taken from the circular item.

Elongated magnetic elements or patterns are provided which are inserted into labels for items or into the items themselves. These elongated magnetic elements may be distributions of fibers, filaments, long or intertwined fibers or threads, strips, coextruded directional dispersions of elongate magnetic materials in a binder or the like. When security elements in the form of pre-made films are inserted into (preferably) or onto articles, the magnetic elements may be patterns of readable information, such as magnetic materials, embedded in or on the film. Preferably the elements are randomly distributed or specifically oriented fibers, filaments, coextruded matrices of film forming binder and magnetic particles or very narrow strips (e.g., thin tapes), as these can provide the highest degree of security, as will be shown later. It is not necessary that the magnetic elements are recordable in the conventional magnetic media sense (as in VHS tape, audio tape, floppy disks, and the like), and it is preferred that the fibers or filaments be magnetic without intent or capability of detailed information recordation during operation of the security system. This would mean that each separate magnetic element would have a single and specific magnetic output if the element were read at substantially any point along its length.

The magnetic elements of the present invention may be (but do not have to be) clearly distinguished from areas or patterns of continuous magnetic particles in binders which are the object of magnetic materials where recording of information is desired. Magnetic media, such as tape, strips, discs and the like, seek to provide a continuous region of magnetic material, usually in the form of discrete particles of magnetic materials dispersed in a binder. The object is to essentially create an apparent continuous coating of magnetic particles so that the maximum amount of discrete information may be carried by the particles. The ideal situation for such media would be to have infinitesimally small particles bound by infinitesimally thin regions of binder so that infinite bits of information could be recorded and read in the particles. These particles usually (when discrete particles of fairly uniform dimensions such as spheres, cubes, tetrahedrons, etc.) have maximum dimensions of less than 5 microns, usually even smaller. Some magnetic media have attempted to use filamentary magnetic materials, and the longest dimensions of these are generally less then 20 micrometers, more preferably less than 15 micrometers, and most preferably less then 10 micrometers. In addition, these magnetic materials, whether filamentary type materials or more conventional particulate materials attempt to fill as much surface area as possible to provide the densest information reading. As such, much more than 80% of the projected area of a surface must be covered by magnetic materials whether particulates or other forms in magnetic recording media which seeks quality recording information. In contrast, the magnetic elements of the present invention may be used where (for example in a linear read path) less than 80% of the area or dimension (in a linear mode) crossed by the reading head contains magnetic elements. For example, it is reasonable that less than 75%, less then 70%, less than 65%, less than 60%, less than 55%, less than 50%, less than 45%, less than 40%, less than 35%, less than 30%, less than 25%, less than 20%, less than 20%, less than 17.5%, less than 15%, less than 12.5%, less than 10%, less than 9%, less than 8%, less than 7%, less than 6%, less than 5%, less than 4%, less than 3%, less than 2.5%, less than 2.0%, less than 1.5%, less than 1.25%, less than 1.0%, less than 0.9%, less than 0.8%, less than 0.7%, less than 0.6%, less than 0.5%, less than 0.4%, less than 0.3%, less than 0.2%, less than 0.1% of the area contain magnetic elements along the read path, as long as the read path contains preferably at least 3 magnetic elements or three portions of a single magnetic element (e.g., a coiled continuous fiber) which can provide signals across the read path. This may be as little as 0.001% of the area (of the percent of the linear dimension along the line) along the read path (in either linear dimensions or surface area) which could contain magnetic elements. This lower limit may be used as a minimum in a range to each of the values listed above to establish the range amount of area or linear portion which might contain magnetic elements according to the present invention (e.g., 0.001% to 0.1% up to 0.001% to 80% surface area or linear content).

Where fibers or filaments coated or embedded with magnetic particles are the magnetic elements of the invention, the percentages for the area should reflect the dimensions of the fibers or filaments and not just the particles or coating thickness on the fibers/filaments.

The simplest conceived construction within the present invention is a preformed element or film strip which may be secured to or into a transactional item,. The preformed element or film strip has at least two magnetic elements attached to the item, each magnetic element having at least one magnetically readable characteristic or spacing with respect to another magnetic element, such as magnetic strength which can be mechanically read as different from the magnetic strength of another magnetic element, signal duration, magnetic orientation, and the like. There are basically two related, but slightly different formats for providing the readable distribution of magnetic elements in the present invention. In the first format, the magnetic elements are preferably elongate (even continuous) and radially straight (as opposed to curved, sinusoidal and segmented) and provide a similar or consistent signal along the length of the element (e.g., the same field alignment, the same field amplitude, etc. along the entire length of the magnetic element). In the second format, the magnetic elements (e.g., fibers, strips, filaments, embedded volumes of magnetic particles) are randomly distributed in the item, label or even within a magnetic strip (e.g., magnetic fibers embedded in the printed stripe binder matrix). The pass of the magnetic reader over the randomly distributed fibers generates a signal unique to each item. As the amount and number of fibers may be controlled, even in the random distribution, an excessive amount of information need not be generated. Because the size and strength of the fibers can be significantly greater than that of individual particles in the strip matrix, the strength and stability of the signal can substantially higher. The first format is capable of providing a single signal which is used to encode individual items of great volume, while the second format can be used to individually authenticate individual items of a lesser number, where information storage is not a problem. For example, the first format would be more applicable to the authentication of casino chips (with a single signal for all like denominations, but a high information content on each item). The second format would be more appropriate for higher value casino chips, specifically for a specific casino with a fewer number of higher denomination casino chips. Both systems and formats could be used for both types of markets with obvious compromises.

With the randomly distributed magnetic elements, it is desirable that the length of the elements are sufficiently long that they can be read easily and consistently with a conventional magnetic reading head, and to this end it may be preferred than the length of the magnetic elements be at least 1%, preferably at least 2%, and more preferably at least 5% of the width of the reading path of a magnetic reading head used in combination with the security item..

The security system is designed so that when the security items move relative to a reading head, as where a casino chip is rolled or otherwise moved through the price reading bar coded device in a controlled direction or the head is moved over the fixed casino chip (e.g., as where a hand held scanner is placed over the casino chip, or a reading head moves within the hand held device) a series of signals is produced, the signals being an encoded signal or other type of specifically predetermined ordering of data points from the elements. It is desirable that the process be performed with a particular end forward and a particular face pointing up, but this is not essential, depending upon the scope of the encoded information. The magnetic elements are aligned in the items to be read (e.g., the transactional item, casino chip or film strip or item of commerce) so that they will enter the reading area of the reading device in a particular ordering. This is, for example, most easily done by having the individual elements extend in a continuous line from side-to-side in the item along the shortest dimension on the face of the item, approximately radial from the center of the item. As the item is moved relative to the reading head, the reading area will detect or create a portion of a complete signal when each readable (magnetic) element passes through the reading area. In an easily constructed mode (and therefore the least secure mode), two magnetic elements may be so aligned within the label (or other security item) so that an at least bimodal (with two elements) signal is read by passage of the magnetic elements through the read area, or two signal points are read which are spaced apart at a predetermined dimension so that the frequency (period) determined by the reading of the two signals (the distance between the elements divided by the speed of movement of the item the security of which is to be enhanced through the reading device) must also match the required frequency (period) for approval or authentication of the item.

The invention also describes a method of authenticating a circular article, said circular article having therein at least three magnetic elements, said method comprising a) moving at least one (e.g., magnetic) reading head along a path or moving said circular article relative to at least one (e.g., magnetic) reading head so that said at least one (e.g., magnetic) reading head senses said at least three (e.g., magnetic) elements as said at least one (e.g., magnetic) reading head moves along said path, the sensing of said at least three (e.g., magnetic) elements generating a first signal, b) comparing said first signal to a predetermined second signal to evaluate a degree of correspondence between said first signal and said second signal, c) indicating whether said degree of correspondence is within a predetermined amount of correspondence to authenticate said article. One embodiment has the path of relative movement linear with respect to the circular article, non-linear but not overlapping a circular path concentric to the outer edge of the circular article, and circular and concentric with respect to the outer edge of the circular article. This method of authenticating an article may also be used where said circular article comprises at least four (e.g., magnetic) elements having at least one dimension which is at least three times greater than any other dimension of said (e.g., magnetic) element, said method comprising a) (e.g., magnetically) reading said magnetic elements in said article by moving a (e.g., magnetic) reading head along a line (e.g., circular path) which allows said reading head to pick up signals from said at least four (e.g., magnetic) elements to generate a first signal, b) comparing said first signal to a second signal which has been predetermined to authenticate a specific article or one of a series of articles, c) determining if a level of correspondence between said first and second signal is sufficient to allow identification of said article.

This method envisions said at least four elements, where they are magnetic elements, to comprise a magnetic material selected from the group consisting of fibers, filaments, and particles having at least one dimension of at least 0.10 millimeters, preferably from at least 0.1 mm to continuous filaments (e.g., greater than 100 mm). Fiber/filament lengths may be at least 0.01 mm, at least 0.05 mm, at least 0.10 mm, at least 0.15 mm, at least 0.20 mm, at least 0.50 mm, at least 0.75 mm, at least 1.0 mm, at least 0.2.0 mm, up to continuous lengths. It is preferred that said at least four magnetic elements comprise fibers or filaments, and preferred where said at least four magnetic elements are randomly distributed fibers or filaments or specifically aligned fibers or filaments, and (where randomly distributed) said second signal is a magnetic signal having been taken of said article to specifically identify said article. Where the magnetic elements are distributed within a magnetic strip which is capable of being magnetically encoded, two overlapping signals may be read. This method has some technical relationship to the method practiced in U.S. Pat. Nos. 5,365,586 and 5,428,683, and the apparatus and encoding reading described therein can be used in the practice of the present invention with greater ease and simplicity then the attempt to read random background noise in a printed strip. By specifically selecting the informational content and size of the magnetic elements to be read in the present invention, the signals may be much more readily differentiated and made more stable. The small particles in the magnetic strip readily move about in the binder and change their magnetic properties over time and when repeatedly read. The magnetic elements of the present invention may be tailored more easily to create distinct and more persistent signals.

The method with printed magnetic strips may be practiced in a number of ways, as where said first signal is determined after said magnetic strip has been encoded. The filaments may also have been aligned within said article in a predetermined pattern, and said second signal identifies a type of article and said second signal was not created specifically by a reading of said first signal. The first signal can comprise a signal content of at least two factors selected from the group consisting of field strength, period and duration. The filaments tend to be longer than fibers and may be at least one or two centimeter long, up to continuous lengths which may be looped within the article.

The format using randomly distributed fibers could be read in a number of ways. The scanning over a specific line (e.g., a line at a constant or approximately constant distance from the center of the circular article) in the item could produce a signal unique to the individual card. This signal could be stored and compared in a file with the individual identifier on the magnetic strip. The random fiber generated signals (and for that matter the aligned filament or element format) could either be read at a separate time than any other magnetic identifier (e.g., the magnetic strip), may be read in the same pass but at a different interval than the strip, may be read at a different location by a separate reading head (e.g., as in a parallel path or concentric reading head), or can be read through the magnetic strip. Just as where the background signal could be read between the magnetically printed signal, the stronger random distribution of fibers could provide a stronger, more readily identifiable and stable imprint. It is also possible to have the two signal strengths of the magnetic strip and the fibers be significantly different, yet both be strong. This would allow for a system where the user identifying magnetic signal is read, with all values above a certain strength excluded, and the authentication signal limited to magnetic signal strengths above the cutoff for the identifier signals.

The reading apparatus is may be a hand held or stationary apparatus. It is a simple configuration if the casino chip is a specific shape, such as circular, and a face plate on the hand held reading apparatus is also circular. The casino chip or item can be placed within the frame of the reading device, the device activated so that a reading head moves across the face plate (or the casino chip is rotated or spun), thereby creating and identifying a signal from the magnetic elements in the casino chip.

Another type of this system as described above would have at least four magnetic elements, at least two of said at least four magnetic elements having a magnetic strength which can be mechanically read as different from the magnetic strength of at least two other of said at least four magnetic elements.

This item could be constructed with at least one of said elements having a colorant attached to said at least one of said elements which fluoresces or phosphoresces when irradiated.

The present invention also describes a process for authenticating an item having at least two magnetic elements forming a security enhancing item comprising a) moving said security enhancing item in a first direction relative to at least one magnetic sensing or reading device, b) placing said at least one magnetic sensing device along a path intersected by said security enhancing item moving in said first direction so that each of said at least two magnetic elements passes within readable dimensions of said at least one magnetic sensing device, said reading device being capable of determining the presence of a magnetic material (and preferably being capable of measuring the intensity of a signal from a magnetic element, determining the duration of a signal from a magnetic element [or sensing the duration of a signal with sufficient accuracy so that a microprocessor can measure the duration of the signal]), and measuring the beginning and ending of a signal with a response time that enables determination of signal duration and gaps between signals so that the period, frequency and/or distance between signals can be measured or calculated from the signal, c) reading at least one signal from each of said at least two magnetic elements to provide an identification signal, said one signal having at least some components being selected from the group consisting of period (including frequency), amplitude and duration, and d) comparing said identification signal to a predetermined signal identifying a particular type of security item.

The process may include an illumination source to cause dye or pigment in elements (or elsewhere printed) to fluoresce or phosphoresce, and a reading of the emitted spectra to be compared to data on the encoded emission spectra.

A readable dimension, as used in the description of the present invention, simply means that the reading device has sufficient sensitivity to be able to sense the necessary information desired to be read from the element at the particular distance at which the element is passed in relation to the reading device. As the magnetic strength of the element increases, the readable distance or dimension increases with a given magnetic reading element. As the sensitivity of the magnetic reading device increases, the readable distance likewise increases with respect to an element of a given magnetic strength.

Now that the simplest, and therefore least secure arrangements have been identified, with even this system being better than present systems used on labels or the like to reduce unauthorized duplication or forgery, more detailed and more secure systems may also be described.

As noted, the simplest system may have a single magnetic element or two magnetic elements which provide a single signal or two bits of information, possibly providing a frequency measurement as well. More secure systems within the scope of this invention would provide multiple magnetic elements which may have different spacing (in a predetermined ordering) between each adjacent element (to provide varying periods between signal readings or between signal maximums), different magnetic intensities on each or various elements to provide different amplitude signals (which may be in combination with different frequency or period signals), and the elements may even be angled from side to side across the security enhancing item so that reading heads at opposite sides of the security enhancing item must provide the same signal at different intervals for the item to be approved.

The security enhancing item may be constructed easily with the magnetic elements included therein by conventional manufacturing techniques, such as preparing wafers with the security information within them and molding the security containing wafers into the casino chip. The wafers may be formed by making large sheets with signalling material (e.g., magnetic material) in the sheets and then cutting wafers from the sheets, or more suitably by extruding a cylindrical element and slicing circular elements from the cylinder. As with many extruded plastics, which have stripes or patterns in them by controlling feed and flow characteristics, the pattern of magnetic material in the wafer or the casino chip itself, may be provided by the extrusion of magnetic containing material into specifically selected areas. For example, in FIG. 5, it would be simple to extrude elements 102, 105 and 106 from flow feed materials. Elements 104, 105, 107, 108, 109 could be readily manufactured by feeding solid elements into the flow stream of the extrudate. This will place the elements appropriately within the wafer or the casino chip. As noted previously, where a film is used to apply the pattern of magnetic elements, the magnetic particles may be coextruded with the film, embedding the pattern of magnetic material and binder in which they are dispersed into the film. By extruding a cylindrical element with the magnetic material in the extrudate, wafers or finished chips may be easily cut from the cylindrical product. The use of shorter fibers or filaments fed loosely into the extrusion process may be used to form the more random patterns which are highly useful for identifying or authenticating individual products.

Similarly, fibers, filaments or elongated magnetic elements which form the elements may be placed within a mold into which plastic is injected or extruded to solidify into an insert or structural element, casino chip or the like. Where the final commercial item is to be formed by lamination, it is a simple task to place the magnetic elements, such as the fibers, filaments or elongated elements forming the elements between the layers to be laminated (e.g., as one of the previously described manufactured wafers), then securing the elements into place by bonding, adhering (with or without additional adhesive materials between the layers) or fusing the layers in the laminate. Extruded layers or columns of adhesive carrying magnetic particles of the magnetic elements may be deposited between the layers before lamination or coextruded into one of the lamina. Generally when filaments are used, sufficient tension should be maintained on the filaments when they are placed into position so that they will retain the accuracy of their position during finishing of the label or security enhancing item and remain in the preferred straight position. This is most easily achieved with lamination techniques where tension may be maintained on both ends of the filaments during the lamination process and then trimmed after the process. The elements may also be prepared in advance in sheets or strips which can be more readily inserted into the final element. For example, large area sheets (continuing a sufficient amount of area to provide material for twenty or more security items) may be constructed with the magnetic elements or filaments coextruded with the sheet formation. The large area sheet may then be converted, cut into the appropriate size insert with the elements appropriately located within each of the cut portions, and the cut portions then interlaid between the faces of the component parts of the label, card, article or other item to be secured around the insert.

It is also possible and expected to provide some degree of visual inspection to the item. This could be done by simply coloring the individual elements. There are, however, even better means available for improving security in addition to the magnetic readout. Elements, in addition to their magnetic content, may also have a second machine-readable or visually-readable content within them. For example, a thin coating may be placed on the element which would not interfere with magnetic readout, and would even protect the element from physical wear, extending the possible use life of the transactional item. This thin coating could contain materials which contained color (dye or pigment) or which materials could alter their color upon treatment. It would of course be preferred if the color change were reversible or temporary. Temporary coloration could be provided, for example, by phosphorescent or fluorescent materials which would emit specific wavelengths of radiation when illuminated or heated. These could be at either or both visual and/or mechanical readable wavelengths and intensities. By combining the magnetic readable signals with mechanically readable electromagnetic spectrum radiation (e.g., color) emitted signals, a very secure anti-forgery system could be readily devised.

Figure 4:
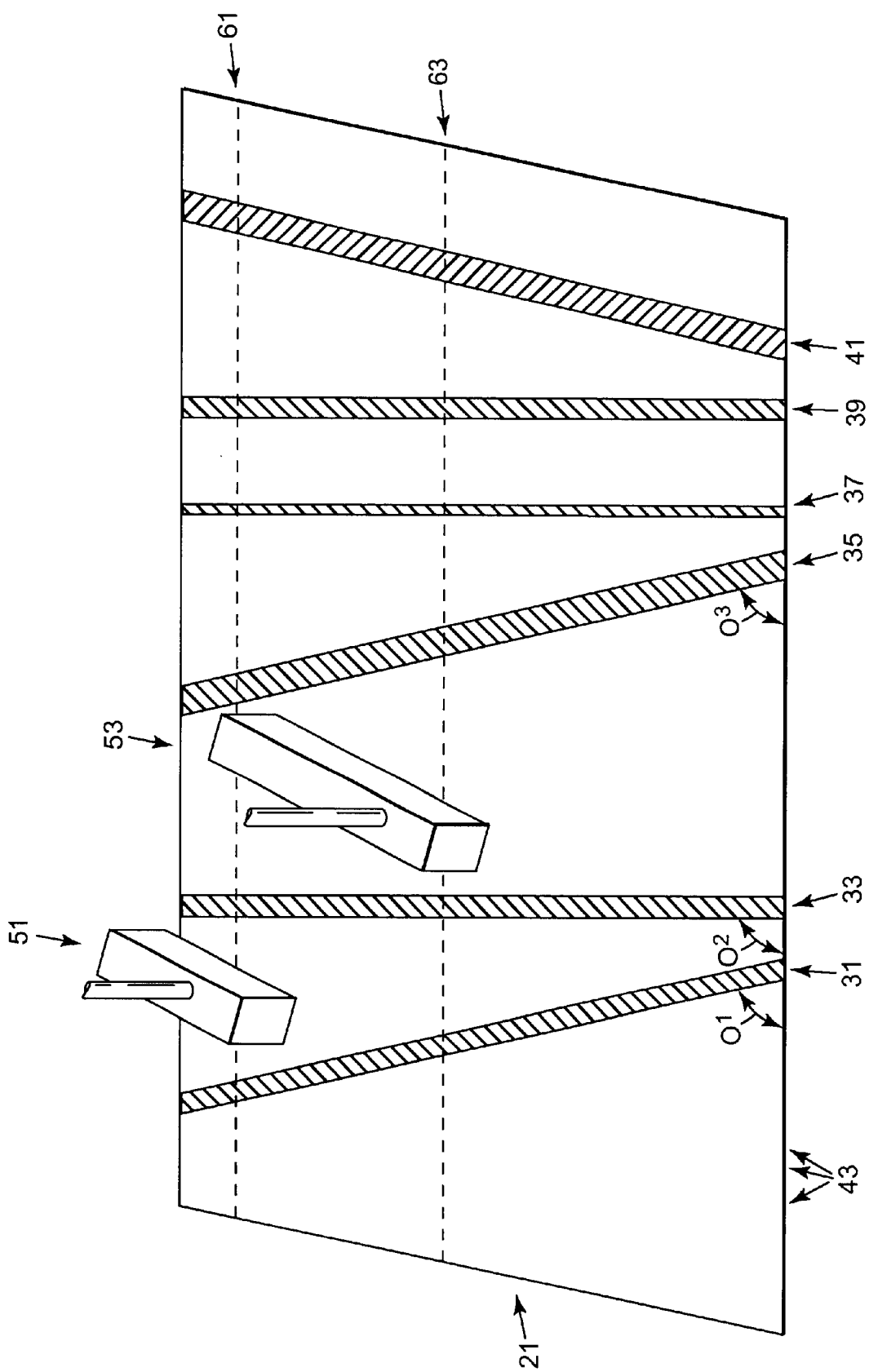
FIG. 4 shows a section of a transactional item 21 with a magnetically readable strip 65 with randomly distributed magnetic fibers 67 therein which may be read concurrently with the reading of the magnetic strip 65 or may be read separately in time or space.

The effects of different element and content ordering within the market items can be expanded upon as follows. FIG. 4 shows a segment of a security enhanced item 1 having six magnetic elements (3, 5, 7, 9, 11, and 13) arranged perpendicularly to the longest dimension of the segment of item 1 (it is referred to as a segment because it is cut from a circular item and normalized to appear two dimensional and rectangular). By providing different strength magnetic materials on each element, six different signals with differing amplitudes (a1, a2, a3, a4, a5, and a6 will be provided. Additionally, there will be 5 different period (or when equally spaced, frequency) signals provided (f1, f2, f3, f4, and f5). These signals are arbitrarily represented in FIG. 1 as to amplitude and period, and can be designed with any number of elements with any variety of variation, which would provide an endless number of codes available to protect transactional items. By varying the thickness of the individual elements (e.g., Element 11), a third signal l determined as the length of the signal (endurance) can be generated. This would require a more refined reading program than the relatively simple program necessary for amplitude and frequency, but this would greatly increase the security of the system, without greatly complicating manufacture of the elements or label items (by merely providing wider elements). These magnetic signals, as indicated above, can be combined with color emission signals to provide additional complexity to the encoding of the transactional items.

The individual elements used in the security systems of the present invention can be manufactured by a number of different means. Filament, fiber or thread can be coated in a vacuum chamber with magnetic material, magnetic particles can be dispersed within dissolved polymeric binder and the filament extruded with sufficient magnetic content in the filament composition, magnetic particles may be electrostatically deposited onto filament and fused thereon, magnetic coatings may be vapor deposited onto the filament, and a fluidized bed of magnetic particles can be used to deposit particles onto the filament (fluidization effected by pulsed magnetic flux, electrical field flux, or other physical means which will fluidize the magnetic particles and bond them to the element support). It is also possible to form strips by conventional coating or extrusion of a support layer (e.g., polyester such as polyethylene terephthalate or polyethylene naphthalate) and then slitting the film into the appropriate size filaments. Where the filaments are extruded, readable color content also may be added directly into the binder. Where the magnetic particles are fused or bonded to the filament (or film) surface, color readable particles may be randomly and proportionately mixed into the magnetic particles. Where film is slit, a separate coating layer of color readable material may be provided onto the substrate before or after application of the magnetic layer. The color readable layer could be between the film base and the magnetic material where the film base and/or the magnetic coating was transparent, allowing transmission of an optical signal through one or preferably both of the layers.

The magnetic materials and particulates preferably used in the practice of the present invention should range from those which magnetize easily but not permanently (e.g., Permalloy™) to those which possess a highly stable magnetism (e.g., certain stable rare earth metals including Neodymium and Samarium, and ferrite magnetic compounds which have an essentially permanent magnetism which is not easily altered by external fields of moderate to weak intensity). Different magnetic materials may be used in the various magnetic elements in the transactional item, with different mechanical reading heads chosen which are capable of responding to or sensing only selected materials. Filaments composed of highly stable magnetic materials as described above may have the permanent magnetic field aligned with respect to the axis of the fiber before or after being incorporated into the item where enhanced security is desired. The alignment of the signal can also be read as an additional security identifier. The magnetic field of the elements should generally be sufficiently strong to be read easily (with some safety factor for decreases in strength over the life expectancy of the item), yet not be so strong as to attract environmental contaminants to the item. The last limit is one of convenience and cleanliness rather than one affecting the functional utility of the system.

When high strength and permanent magnetic materials are used in the magnetic elements, the verification process may be enhanced in its ability to be distinguished from magnetic inks. If the label or security item is passed through a moderate strength magnetic field before the item is read, the traditional inks can be distinguished from the strong and permanent elements. The traditional and commercially available inks will not retain a high level of magnetism whereas the high strength and permanent magnetic elements will neither show a permanent loss of strength nor lose its field alignment.

The reading device must at least be capable of reading the frequency or the amplitude or duration of the signals independently. This is easily accomplished as this capacity is readily available in conventional magnetic reading devices. It is preferred that the reading device be capable of reading at least two or even three of these qualities of the signals. It is even more preferred that the reading device include an optical reading function, such as the illumination/fluorescence measuring system described in U.S. Pat. No. 5,418,855. The combination of these four distinct codeable entries (frequency, amplitude, duration and emission) would provide a very high level of security. Upgrades on the code signals would then be provided to each placement of reading device, new series of fashions, and the security of the articles would be further enhanced by regular changes in the code. It is desirable in this system to have articles replaced regularly in normal transactional events. This provides a side benefit of making counterfeiting more difficult, and can trace the flow of specific goods more readily. The combination of the in-place security system and a central location for record analysis or comparison is also within the skill of the artisan. For example, the in-place security authenticating device can be connected through lines to a central processing station. Other aspects of the transaction can be combined with the authentication step through the central processing station.

The security of the system could be further enhanced by having at least some of the magnetic elements lying at an angle other than radial to the center of the transactional item. If the elements were designed at, for example, an angle of fifteen degrees and 25 degrees, respectively, and two separate magnetic reading heads were placed to read along paths 112 and 114, as the transactional item was relatively moved through the reading apparatus, different signals (with respect to at least duration) would be generated from each element at each head because of the changed dimension of the angular segment as it is measured away from the center 101 of the item 100. By encoding the dimension difference between the two heads (that is the time lapse or period between when each piece of the information is read by each head), an additional level of security can be generated. This level of security can be readily heightened with additional position alterations in the elements. The level of complexity in the formation and reading of these signals is actually rather small, but the ability to fraudulently reproduce them by other than highly sophisticated technology is significantly reduced.

FIG. 5 shows an even more complex and therefore less readily counterfeited segment of an item 21. This item 21 has six readable elements (31, 33, 35, 37,39 and 41). The angle of the individual readable elements (e.g., 31, 33 and 35) with a side edge 43 of the item 21 may differ from element to element. Element 31 may form angle $O^1$, 33 may form angle $O^2$, and 35 may form angle $O^3$. As a first magnetic reading head 51 is moved along a path 61 on one side of the item 21, a specific signal comprising frequency, amplitude and duration is generated by the passage of the head 51 across the path 61. Because of the different angles formed by the various elements (31, 33, 35, 37, 39, and 41), the frequency read by a second magnetic reading head 63 would be different from the frequency read by the first magnetic reading head 61. The amplitude and the duration read by the two heads (61 and 63) could, however, be the same. They could be different if the width of the individual elements varied and/or the strength of the magnetic coating varied along the length of the elements (although this becomes a less easily controlled level of complexity in manufacturing). a third magnetic reading head (not shown) could also be added at an intermediate position and this would provide a third signal with varying frequency from the first two signals.

Because the coding of the magnetic elements is within the discretion of the manufacturer, the design and alignment of the elements is not strictly limited to arragemnts pecfically shown in the Figures. Where two reading heads are used, such items which have the elements in the same angle, but not in the same order or position (as would be the result of an element extending across the entire printed sheet before slitting and crossing over other elements), can well be identified by a standard code. If the code reads the ordering of only those perpendicular or radial elements, does not read the frequency or period of angled elements, and compares only the amplitude and duration (and different time between signals at one edge versus another edge on the item, a result of the angling across the item and the different orientation of the reading heads with respect to the leading edge of the item as being scrutinized by the reading device), that element may also have an identifiable code aspect within the authentication system. Both reading heads would identify the amplitude and duration of the same element (as approximately the same), and then the time lag of one part of the element (read by the first head) with respect to a specific other element would be compared with the time lag of another part of the element (read by the second head). A comparison of the different time lags with respect to a specific vertical element within the label or security item would be an indicator of the angle of the angled element. The angle of the element, without respect to its specific location relative to one or more other elements, would then become an additional component of the encoded information.

Looking at FIG. 1, the figure of a security item shown in the Figure can also represent a patch or insert (e.g., from 1×2 mm, up to about 2×5 cm) comprising a plastic film having embedded therein the distribution of magnetic elements described in the practice of the present invention. The patch or insert may be taped, fused or further embedded within the structure of the media. Magnetic coatings are to be applied to the filaments by conventional vapor deposition or coating of the polyester filaments with a coating solution of particulate (e.g., less than 0.05 mm) magnetic Permalloy™ particles in a dissolved binder which adheres satisfactorily to polyester (e.g., another polyester in solution/dispersion).

Conventional reading heads from audio or video equipment may be modified (particularly in their alignment) to read the items containing the magnetic elements of the constructions of the present invention.

One filament of a pair of 0.1 mm filaments is coated with Permalloy™ by vapor deposition (filament 1) and the other (filament 2) is coated with a lower surface area density of the same magnetic material by solution coating with a 10% solids solution of 5% by weight magnetic particles and 5% by weight polyester binder. The magnetic field generated by the two different filaments will therefore vary by a factor of at least 5 from the higher intensity (vapor deposited) filament to the lower intensity (solution coated) filament. The inclusion of the particles into extrudable plastic materials, and especially into polyurethane compositions, would also be a convenient method of manufacture.

A second pair of filaments having diameters of 0.2 mm are similarly treated by the two different processes so that another pair of different diameter filaments is provided with two different field strengths, filament 3 having the higher field density vapor deposited coating and filament 4 having the lower field density solution coated magnetic coating.

A patch or wafer may be prepared by arranging the filaments in the desired orientation such as, reading left-to-right (with the relative angle of the filament with respect to the bottom edge of a film of polyvinyl chloride indicated in parentheses), filament 1 (90), filament 2 (90), filament 3 (75), filament 1 (75), and filament 4 (90). A second film of polyvinyl chloride may be carefully laid over the first layer with the filaments oriented thereon, and the two layers of vinyl resin fused by the application of heat and pressure to laminate the filaments between the sheets of vinyl. This would secure the filaments in a fixed relationship within the vinyl resin. This procedure may be repeated to make as many patches as needed. a segment of the laminate is cut out, leaving the filaments in a predetermined relationship within the laminate. The code is read by a magnetic head and the signal recorded. The signal would identify the ordering, intensity, duration and period amongst and between the filaments. Two offset heads would be necessary to read the angularity data capable of being provided by the angled filaments. Two magnetic reading heads from an audio tape deck may be assembled on a small platen, equidistant from an edge, with conventional signal translating devices still attached to the heads. This portable prototype device could be carried from apparatus to apparatus, if needed. The signal reading portion would be provided with the ability to compare signals (any CPU can accomplish this). The patch from which the signal has been read and recorded would be cut from the laminate and then applied to the outermost edge of a label. The portable reading unit would then be carefully inserted over the label, with the heads located at the reading position of the expected location of the label on the outer edge of the apparel. The CPU device is set up so that when a signal is read, if that signal is properly correlated with the recorded signal, the electrical circuitry identifies an authenticated article. If the signal read from the patch does not match the recorded signal, the CPU is programmed to signal an identification failure and the presence of a probable forged article.

A second method of item preparation is even simpler. Various of the filament samples described above are chopped into fibers of various lengths. The fibers are dispersed into a binder such as polyvinyl butyral and printed as a stripe on a credit card, immediately adjacent to the conventional magnetically read strip. Two reading heads are provided which separately read the magnetic strip and the printed strip of fiber and binder. Each head will produce a distinct signal. The fiber strip, being random and with an information content of essentially unlimited numbers of magnetic points, will fingerprint the printed strip and the item to which it is attached.

Figure 2:
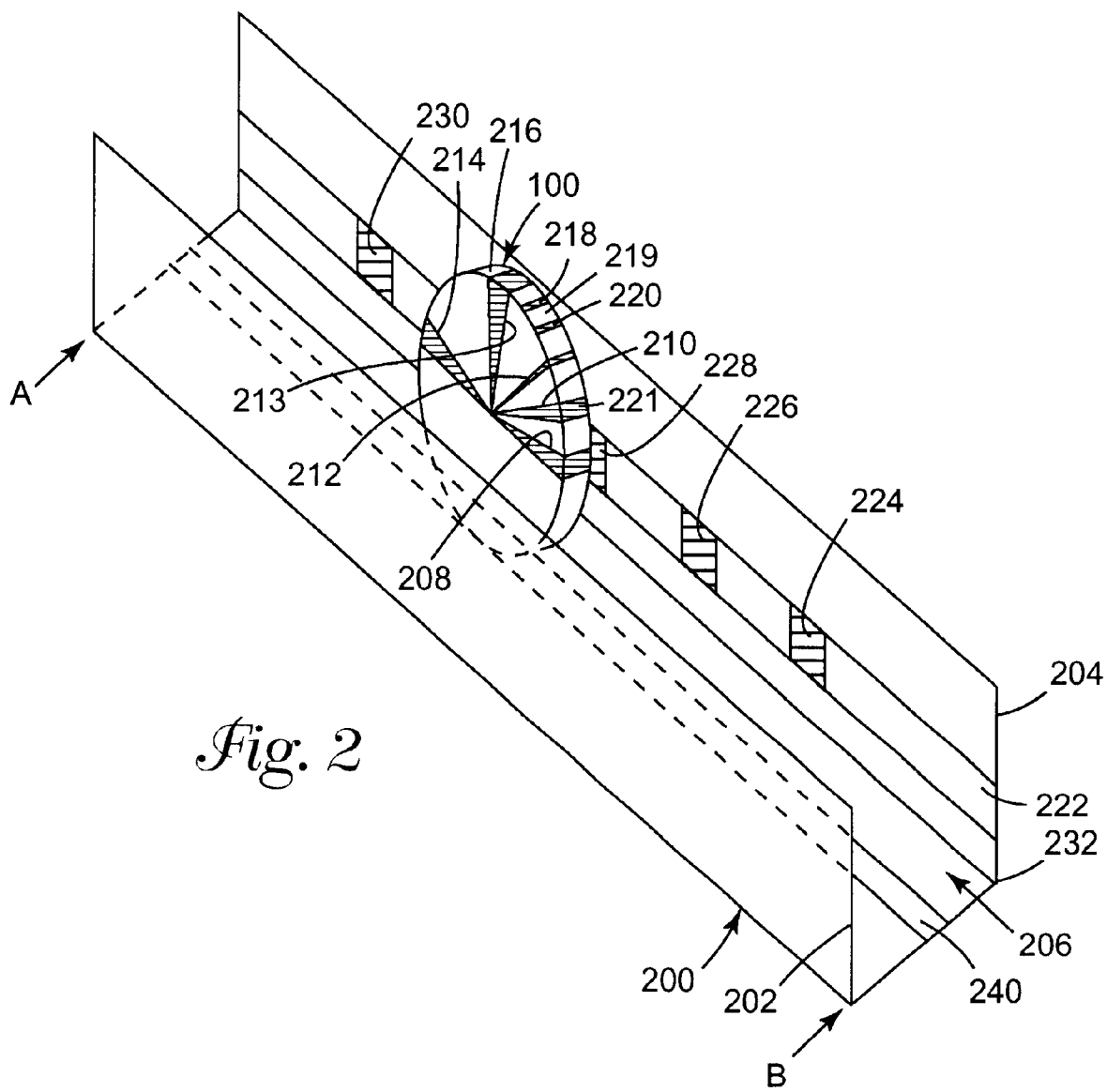
FIG. 2 shows a circular casino chip being read by apparatus according to one practice of the present invention.

FIG. 2 shows a casino chip 100 according to the present invention being read within a reading assembly 200. The walls 202 and 204 form a trough 206 along which the casino chip 100 may roll. The separation distance between the walls 202 and 204 should be sufficient to allow the chip to roll easily, but should not be so far apart to allow the casino chip 100 to fall over or get so far away from vertical alignment as to interfere with the reading of the signal from the casino chip 100. The casino chip 100 is shown with five exposed elements 208, 210, 212, 213 and 214 containing information which may be read. It should be noted that the edge 216 of the chip 100 also has readable information thereon as edge markings 218, 219 and 220. These edge markings 218, 219 and 220 may be read independently of the reading of the relatively radial information elements 208, 210, 212, 213 and 214. It should also be noted that the edge markings 218, 219, and 220 do not have to be coextensive with the relatively radial markings 208, 210, 212, 213 and 214. Note also that relatively radial information element or marking 210 does not have any information on the edge 216 within the virtual area 221 which is an extension of the relatively radially aligned information or marking 210. As the casino chip 100 moves from side A to side B of the reading assembly 200, the relatively radial information elements 208, 210, 212, 213 and 214 pass along a bank 222 of reading heads 224, 226, 228 and 230 and are read at either a constant radial distance (when the casino chip 100 is centered in front of a reading head) or at a random radial distance (when the chip is not centered) within the casino chip 100. By having reading heads along the lowest edge 232 of a wall 204, the information may be read at a constant radial distance (at the edge 216) of the casino chip 100. A reading strip 240 may be provided within the trough 206 to read the information on the edge 216 provided by edge markings 218, 219 and 220, as well as extended edge information from the relatively radial markings 208, 210, 212, 213 and 214.

Figure 3:
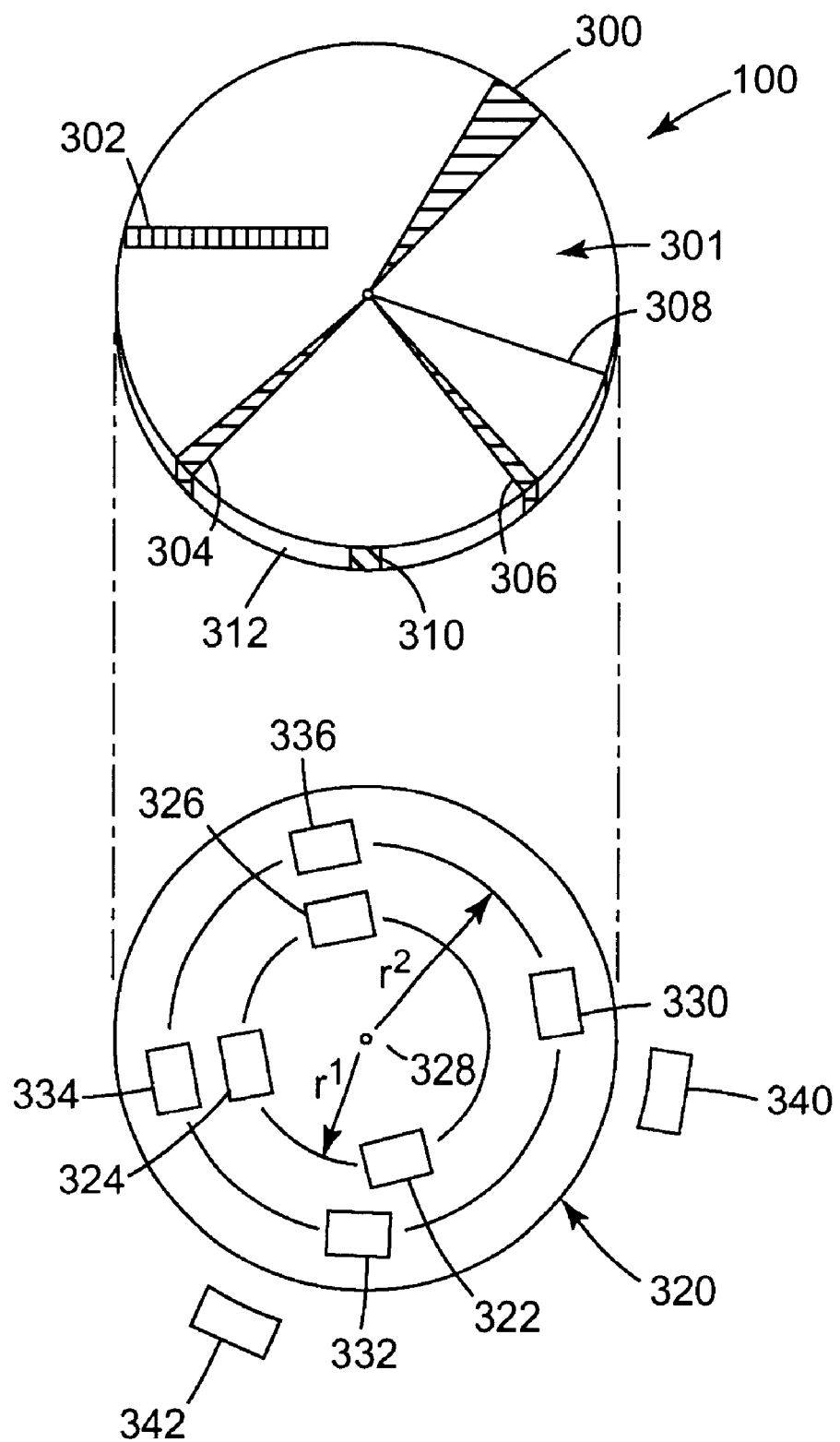
FIG. 3 shows a circular casino chip being read by apparatus according to one practice of the present invention.

A simpler and more precise reading apparatus for casino chips is shown in FIG. 3. A casino chip 100 is shown with information readable from a face 301 located within information elements 300, 302, 304, 306 and 308 (with the latter four being relatively radial). Edge information 310 not continuous with relatively radial face readable information is also shown. This casino chip (with presumptively, in this case) equivalent face readable information on the other face (not shown) is placed within readable distance of a reading element 320. There is relative circular movement initiated between the casino chip 100 and the reading element 320 (either by rotating or spinning the casino chip 100 or by rotating or spinning a portion of the reading element 320. A first set or single reading head 322, 324 and 326 is positioned with a radial distance of r1 relative ot a center 328 of the reading element 320. A secong reading element or bank of reading elements 330, 332, 334 and 336 are positioned at a secong radial distance r2 away from the center 328 of the reading element 320. The banks will read the information from the casino chip 100 at two different radial distances (although one radial distance can provide a security reading of certain attributes but without the capability of reading others as identifed earlier in this patent). The relative speed of movement of the casino chip 100 and the reading element may be within any operable range for such equipment which may, for example, be between 1 rpm and 1 few hundred (e.g., 100, 200 or 500) rpm. Preferably the relative movement is between 10 and 200 rpm. The information and reading technology is preferably magnetic, but optical, fluorescent, or even physical reading (of grooves) may be performed.

The markings on the coins or casino chips, as noted herein, extend to the edges of the coin or casino chip. This also allows for the chips to be counted by passing a magnetic reading device parallel to a stack of chips, reading the magnetic elements on the sides of the chip. This can be enhanced by the placing of a magnetic element along the circumference of the chip, with each denomination of chip having a different magnetic signal, that may be a single magnetic response of different intensity for each denomination chip or may be a two to ten unit signal, with or without varying intensity. A greater number of units may be used, but they become superfluous, as the read merely has to differentiate between a limited number of chips (e.g., denominations of 1, 5, 25, 100, 500 and 1,000 dollars are typically used, with $2.50 chips also being common).

The reading instrument needs only to pass along the side of a stack of chips, and may be built into the dealer's chip tray and/or built into player chip trays. This counting mechanism can therefore be automatic and can be monitored from a central point. At the present time, chip counting is done by a team of security personnel that visit each table, each personnel and the dealer making an independent count of the chips and then confirming the count. With the counting function on the chips and built into the dealer's tray, a continuous count of chips or periodic count of chips may be made automatically. This system may be in combination with the security markings of the present invention or may be independent, providing an automatic and labor-saving count of chips whenever desired.

What is claimed:

1. A method for authenticating or identifying a circular casino chip, betting chip or token having mechanically readable information thereon to identify or authenticate the casino chip, betting chip or token, wherein said chip or token is circular and wherein magnetic information is present in said casino chip, betting chip or token and said magnetic information at least in part comprises a mass of binder containing magnetic material which forms a part of said circular casino chip, betting chip or token, said information comprising encoded information identifying or authenticating said casino chip, betting chip or token which is readable at a radial distance from a central area of said casino chip, betting chip or token by a single pass relative to a mechanical reading element, at least some of said information extending radially to a face of said casino chip, betting chip or token comprising placing said casino chip, betting chip or token in position relative to a reading element for reading said information on said circular casino chip, betting chip or token, moving said circular casino chip, betting chip or token relative to said reading element, reading said information from said circular casino chip, betting chip or token, and comparing said information from said reading to second information relating to authenticity or identifying data for circular casino chips, betting chips or tokens and determining if said circular casino chip, betting chip or token is authentic or specifically identified wherein said circular casino chip, betting chip or token has at least a first and a second magnetic element permanently attached to the casino chip, betting chip or token forming a first source of magnetic information, each magnetic element having at least one mechanically readable magnetic property along the length of said fiber, filament, magnetic mass, or strip or physical spacing from said second magnetic element that is readable as different from a magnetic property or position of the second magnetic element.

2. A circular casino chip, betting chip or token having at least a first source of mechanically readable information permanently attached to the circular casino chip, betting chip or token to form a source of mechanically readable information on said circular casino chip, betting chip or token that is detectable by relative movement of said circular casino chip, betting chip or token past a reading device, with said relative movement occurring along a path, said circular casino chip, betting chip or token also having a second area of mechanically readable information readable during relative movement of said circular casino chip, betting chip or token along said path, said second area of mechanically readable information having a known pattern of information useful in determining the instantaneous speed of said relative movement at any time during said relative movement of said circular casino chip, betting chip or token.

3. The circular casino chip, betting chip or token of claim 2 wherein at least one set of magnetic information is within a wafer laminated to at least one face of said circular casino chip, betting chip or token.

* * * * *